United States Patent

Trewhella, Jr.

Patent Number: 5,246,184
Date of Patent: Sep. 21, 1993

[54] STORAGE REEL AND COVER

[75] Inventor: Stephen W. Trewhella, Jr., Columbia, S.C.

[73] Assignee: Glassmaster, Inc., Columbia, S.C.

[21] Appl. No.: 886,759

[22] Filed: May 21, 1992

[51] Int. Cl.$^5$ .................. B65H 75/18; B65H 75/28
[52] U.S. Cl. ............................... 242/117; 242/125.1
[58] Field of Search ........... 242/117, 115, 116, 125.1, 242/118.7, 118.8, 118.6

[56] References Cited

U.S. PATENT DOCUMENTS

| | | | |
|---|---|---|---|
| 2,193,407 | 3/1940 | Hagen | 242/117 |
| 2,846,162 | 8/1958 | Allin, Sr. et al. | 242/125.1 |
| 2,954,702 | 10/1960 | Petersen | 242/117 |
| 3,051,446 | 8/1962 | Nelson et al. | 242/117 |
| 3,289,972 | 12/1966 | Hafner | 242/118.7 |
| 4,066,224 | 1/1978 | Hargreaves et al. | 242/118.6 X |
| 4,657,203 | 4/1987 | Crawford | 242/117 X |
| 4,688,765 | 8/1987 | Guangorena | 242/117 X |
| 4,938,432 | 7/1990 | Kurt et al. | 242/117 |

FOREIGN PATENT DOCUMENTS

1088571 9/1960 Fed. Rep. of Germany ...... 242/117
1949665 4/1971 Fed. Rep. of Germany ...... 242/117

Primary Examiner—John M. Jillions
Attorney, Agent, or Firm—Renner, Kenner, Greive, Bobak, Taylor & Weber

[57] ABSTRACT

A storage reel embodying the concepts of the present invention is particularly adapted for storing cable that is subjected to creep. The storage reel has a pair of laterally spaced side flanges. Core means extend between the side flanges to define a cable-engaging surface. This cable-engaging surface has a coefficient of friction of at least 0.499. This coefficient virtually precludes creep between the cable and the storage reel. An anchor aperture penetrates at least one of the side flanges to permit one end of the cable to extend therethrough, and a fastening means is employed to secure that end of the cable to the exterior surface on that side flange. The present invention also contemplates the use of a cover structure that may be secured to at least one side flange to contain the cable end that penetrates that flange.

10 Claims, 8 Drawing Sheets

STORAGE REEL AND COVER

TECHNICAL FIELD

The present invention relates generally to cable storage and dispensing reels. More particularly, the present invention relates to a novel and unique construction for a storage reel. Specifically, the present invention relates to storage reels having a unique configuration that restricts cable creep and which may include an end cover that not only provides a containment volume for any cable creep that might occur but also prevents contact between the cable and adjacent structures, or personnel, while the reel is being moved or dispensing the cable.

BACKGROUND OF THE INVENTION

Reels, or drums, for storing cables, such as large diameter optical strands or multi-strand communication cables, are generally constructed with axially spaced, wooden side plates, or flanges, that are conjoined by a fiber (paper) or wood-stave core. In the alternative, the reels have been made of steel that has been treated with a rust inhibitor for improved life. The cable is wound onto the reel—usually in lengths of 10,000 feet or more. In preparation for winding the cable onto the reel, one end of the cable is anchored to one side flange of the reel. To anchor the cable to the reel, one end of the cable is typically fed through a slot, or anchor aperture, that penetrates one side flange, or plate, in radially outer proximity to the core, and that end is then stapled, or otherwise secured, to the outer surface of that side flange. The desired amount of cable is then wound onto the core in the space between the side flanges.

Reels, with the cable wound thereon, are then stored for various lengths of time in one or more locations that are subject to changes in ambient conditions. As a result, the cable and the storage reel undergo expansion and contraction in response to changes in the climatic conditions to which they are subjected during this storage period. Reels using wood-stave, or fiber, cores are particularly subject to water absorption and thermal warpage. Specifically, such reels have a high water absorption potential and the resulting warpage causes swelling, and eventual delamination, of the core material. Failure of the core generally requires rewinding of the cable. Thus, reels having either the wood-stave, or fiber, core must be stored in a climatically controlled environment in order to minimize deterioration, which significantly increases the storage cost. Steel reels are generally capable of being stored outdoors, but they are subject to rust when the rust protection wears off.

Some reels having wood-stave cores can be disassembled after the cable is dispensed to reduce the space required for storage or shipment to the winding facility, but generally the means by which those reels are assembled do not readily permit disassembly without adversely affecting the structure of the components from which the reel is made. Although these reels have the lowest original manufacturing cost, they can only be used once. They are generally non-recyclable, and they must be stored in a climatically controlled environment after assembly—and particularly after the cable has been wound thereon.

Historically, the fiber core reels must remain assembled and therefore require more space for storage and shipment to the winding facility. These reels have an original cost of approximately twice the cost of reels having wood-stave cores. They, too, can be used only once, are non-recyclable and must be stored in climatically controlled conditions after assembly and following the winding of a cable thereon.

Steel reels are typically not fabricated to be disassembled and therefore require large storage space. In addition, steel reels have an original cost of from about twenty to about thirty times the cost of the wood-stave reels, but steel reels can be reused. The principal structural drawback to steel reels is that the side flanges require frequent maintenance due to bending and erosion of the rust inhibiting coating.

Cable stored on either the wood-stave core or the fiber core reels is subject to "creep." Creep is defined as the extrusion, or "out-feeding," of cable through the anchor slot. The amount of cable creep is generally between one to one and one-half percent (1 to 1.5%) of the cable length. That length of the cable which is extruded by creep flails about as the reel is rotated to dispense the cable. The flailing cable end can cause damage to vehicles, other equipment and/or personnel in the immediate vicinity. In fact, the prior art reels often have a warning posted thereon which advises the reader of this danger. To minimize the damage that can be inflicted by the flailing cable end, it must be occasionally trimmed, and those trimmed lengths are, therefore, wasted. This problem is sufficiently serious that a worker is generally assigned the task of inspecting for extruded cable and trimming the extruded end, as necessary.

The source of "creep" appears to be the direct result of a low coefficient of friction between the reel core and the cable wound thereon, and/or dissimilar coefficients of thermal expansion between the cable and the real core. Flexing of the wooden staves also appears to contribute to this ubiquitous problem. The commonly employed solution, other than to use the expensive steel reels, is to wind an additional one to one and one-half percent (1 to 1.5%) of the required cable length onto the reel in order to be assured that the customer has the correct amount available, even though there is a significant loss due to creepage and trimming. This approach results in a significant cost increase to the cable company, and their customers, in view of the high cost of cable per unit length.

SUMMARY OF THE INVENTION

It is, therefore, a primary object of the present invention to provide an improved storage reel having physical characteristics that tend to prevent cable creep.

It is another object of the present invention to provide an improved storage reel, as above, having a composite core member with a sufficiently high coefficient of friction to preclude relative rotation of the stored cable relative to the core, even during dispensing of the cable from the reel.

It is a further object of the present invention to provide an end cover for an improved storage reel, as above, wherein the storage reel has an anchor aperture through a side flange for permitting a cable end to pass therethrough for securement to the outer surface of that side flange, and further wherein a cover is secured to that side flange cooperatively to form an enclosed containment cavity within which any extruded cable end may be contained.

These and other objects of the invention, as well as the advantages thereof over existing and prior art forms, which will be apparent in view of the following detailed specification, are accomplished by means hereinafter described and claimed.

In general, a storage reel embodying the concepts of the present invention is particularly adapted for storing cable that is subjected to creep. The storage reel has a pair of side flanges that define both the axially and the radially outer extents of an annular cable storage volume. Core means extend between the side flanges to define an inner, substantially cylindrical, cable-engaging surface. The cable-engaging surface has a coefficient of friction of at least 0.499 for cooperating with a cable stored in the storage volume. This coefficient virtually precludes creep between the cable and the core of the storage reel during storage and cable dispensing by limiting the creepage to less than one tenth of one percent of the total cable length store on the reel.

A cable anchor aperture penetrates at least one of the side flanges to permit one end of the cable to extend therethrough. A fastening means is employed to secure that end of the cable extending through the anchor aperture to the exterior surface on that side flange penetrated by the anchor aperture.

The present invention also contemplates the use of a cover structure that may be secured to at least one side flange to contain the cable end that penetrates that flange. The end cover has a central hub portion and a radially outer mounting flange. The central hub portion and the mounting flange are disposed in substantially coplanar relation. An end wall is located in axially spaced, parallel relation to the central hub portion and the outer mounting flange. A radially inner annular wall extends axially between the central hub portion and the end wall, and a radially outer annular wall extends axially between the mounting flange and the end wall. A containment cavity is bounded by the end wall, the radially outer and radially inner annular walls on the end cover as well as the exterior surface on the side flange of the reel to which the end cover is attached.

One exemplary storage reel embodying the concepts of the present invention is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

One representative form of an improved storage reel embodying the concepts of the present invention is designated generally by the numeral 10 on the accompanying drawings. The representative storage reel 10, as seen in the drawings (FIGS. 1-9, in particular), has a pair of first and second side flanges, or plates, 11 and 12 which are spaced axially by a core 14 that extends axially between the side flanges 11 and 12. Each side flange 11 and 12 has a central opening 15 (FIGS. 2-7) and an annular groove, or recess, 16 routed, or otherwise formed, in the opposing faces 18 and 19 of the respective, first and second side flanges 11 and 12. The groove 16 is located radially outwardly of, and concentric with, the central opening 15 in each side flange.

The core 14 is substantially cylindrical, and the opposite ends 19 and 20 are received within the annular grooves 16 in the opposed side flanges 11 and 12, respectively. The opposite ends 19 and 20 of the core 14 are secured within recessed grooves 16 by a plurality of retaining rods 21 that extend through the center of core 14 and pass through bores 22 that penetrate the flanges 11 and 12. The retaining rods 21 also support, and affix an anchor plate 23 on the exterior surface of each flange 11 and 12. As shown, the anchor plate 23 may be recessed into the exterior surface 35 of each flange.

An axle 25 may be permanently secured to the anchor plate 23. In the alternative, the anchor plate 23 can be provided with a central opening 26, as shown, through which the axle 25 can be installed during winding and dispensing of the cable 29. By using the central opening 26 as a bearing, the axle 25 will provide rotary support for the reel 10 when a cable 29 is wound onto the reel 10 or dispensed therefrom. At least one end 30 of each retaining rod 21 may be threaded to receive a conventional fastener, such as the nut 31. The other end may present a head 32. Other conventional methods of securing the retaining rods 21 to the reel 10 can be utilized. However, the threaded fastener arrangement tends to facilitate assembly, and disassembly, of the reel 10. By providing a facile means by which to assemble and disassemble the reel 10, the components thereof may be manufactured at one or more locations for shipment to, and final assembly at, a facility where the cable 29 is wound onto the reel 10.

Figure 1:
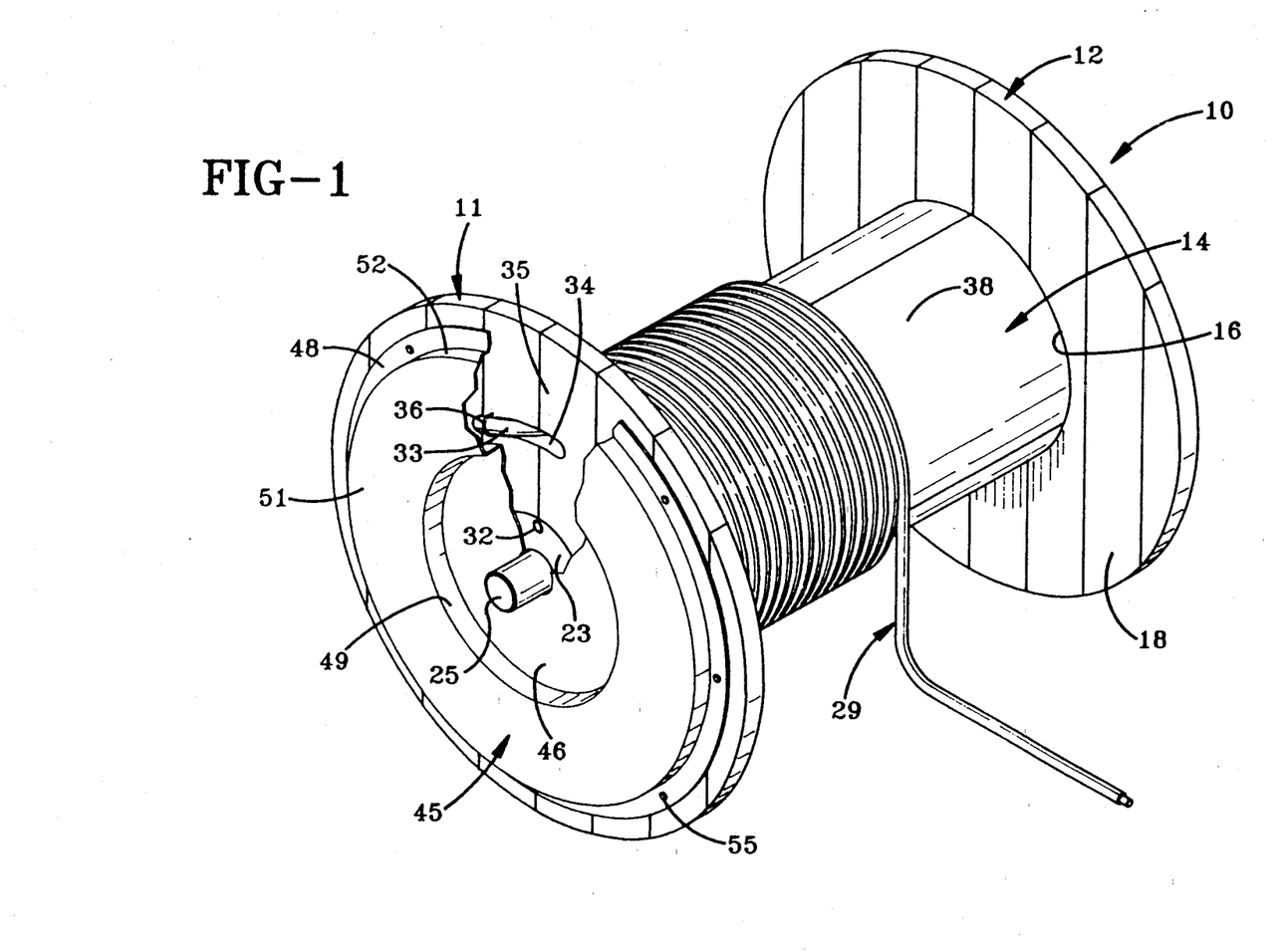
FIG. 1 is a perspective view of a storage reel and end cover embodying the concepts of the present invention and with cable partially wounded on the reel.

A short length at the end 33 of the cable 29 is inserted through an access opening, or cable anchor aperture, 34 provided in at least one of the side flanges 11 or 12. The anchor aperture 34 is preferably located radially outward of, but in close proximity to, the annular groove 16 which receives the ends 19 or 20 of the core 14. For the purpose of this disclosure it may be assumed that the anchor aperture 34 is provided in flange 11. Obviously, it does not matter which flange 11 or 12 has the cable 29 fixed thereto. The cable 29 is inserted from the storage side of the flange 11 through the exterior surface 35 of the flange 11 where it is anchored to the surface 35 by a conventional securement means such as a staple 36 (FIG. 1). After the end 33 is secured, the cable 29 is wound onto the core 14 until the annular storage space defined by the flanges 11 and 12 and the core 14 is substantially filled. Typically, optical transmission cables are stored on reels in lengths of from about 10,000 to about 15,000 feet. The storage reel 10, filled with cable 29, may be stored for a considerable length of time prior to being shipped to a dispensing location without deterioration or weakening of the reel 10.

Figure 2:
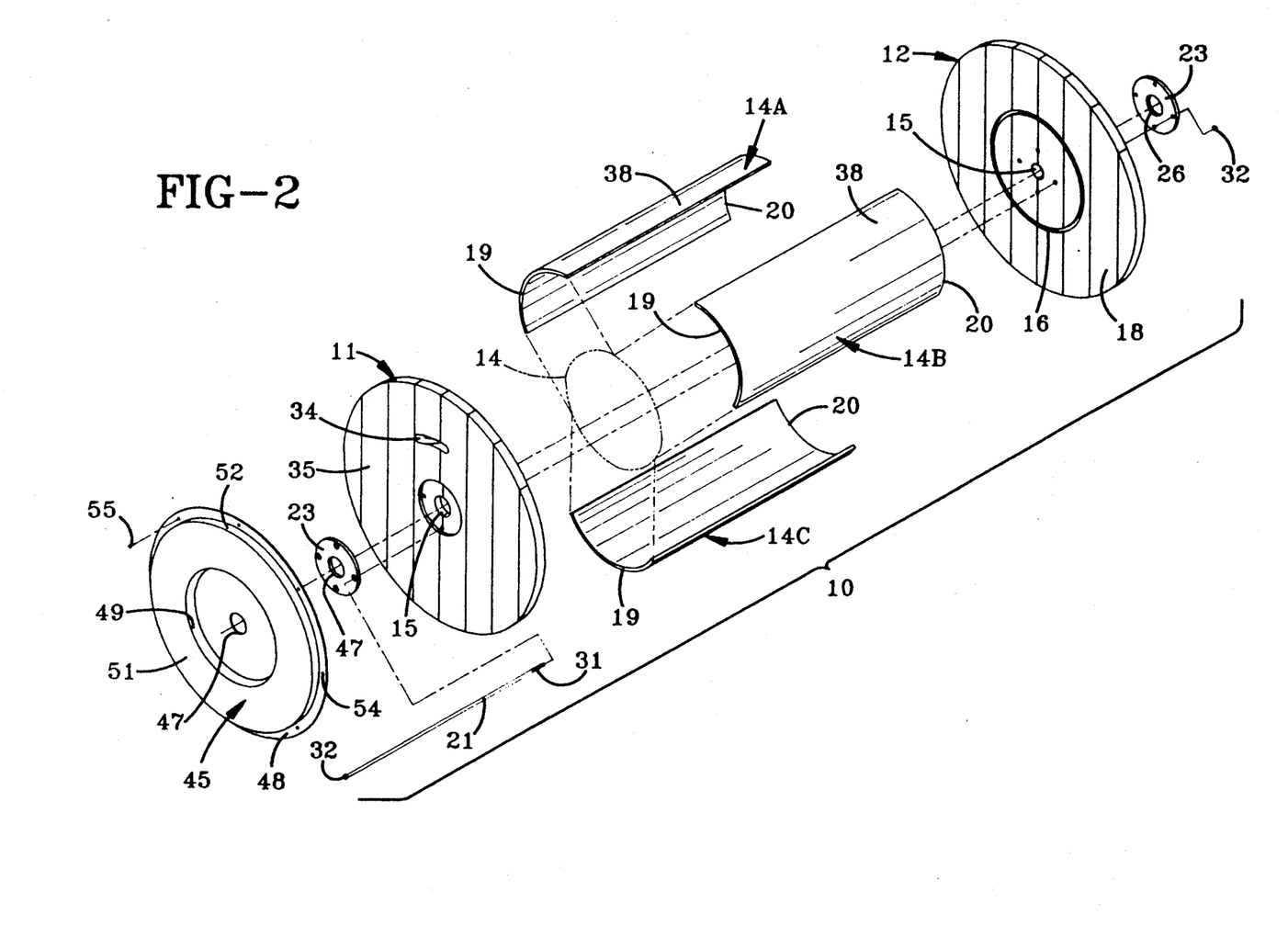
FIG. 2 is an exploded perspective view of the storage reel and end cover depicted in FIG. 1.
Figure 3:
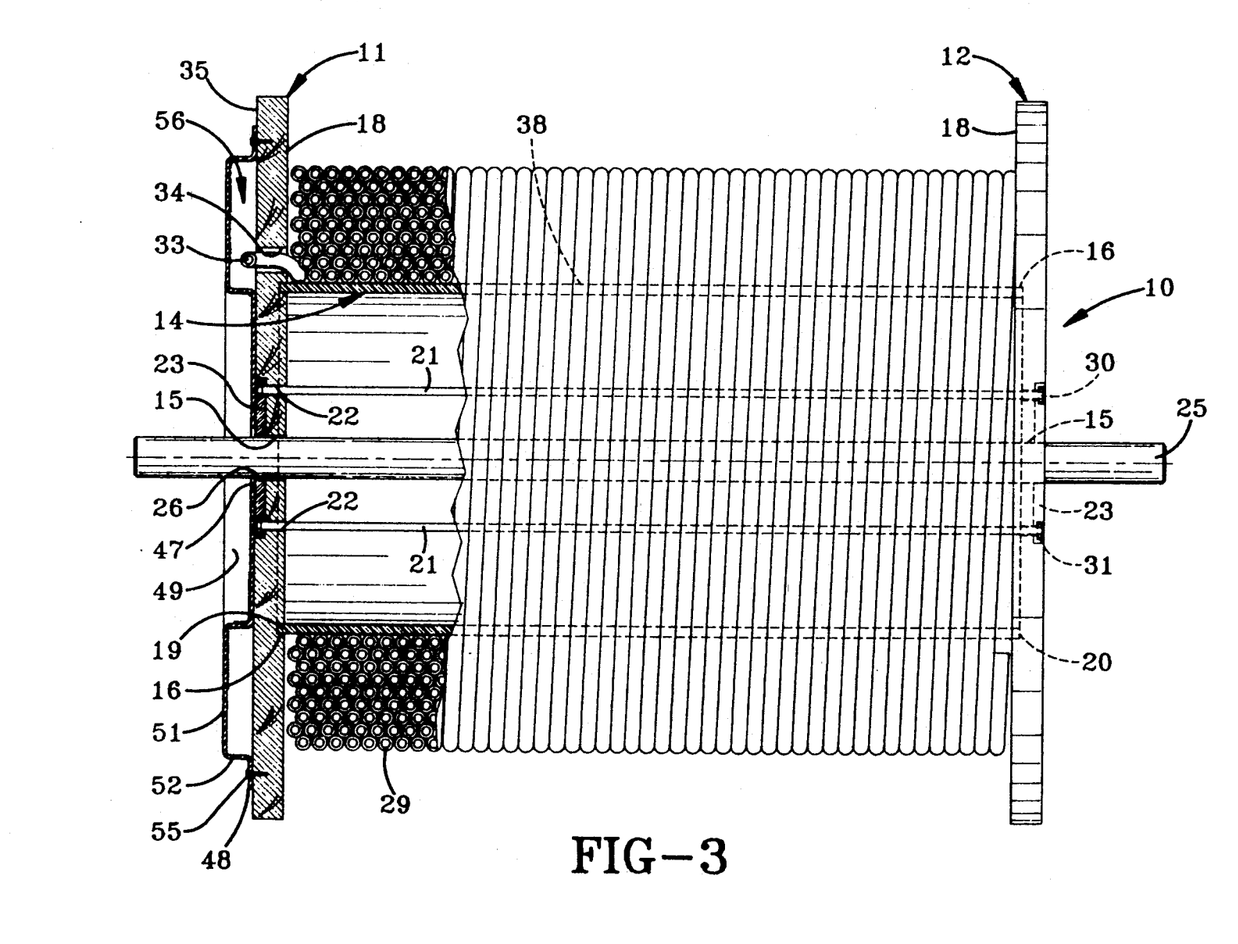
FIG. 3 is a side elevation of the storage reel depicted in FIGS. 1 and 2 with a cable wound thereon.
Figure 4:
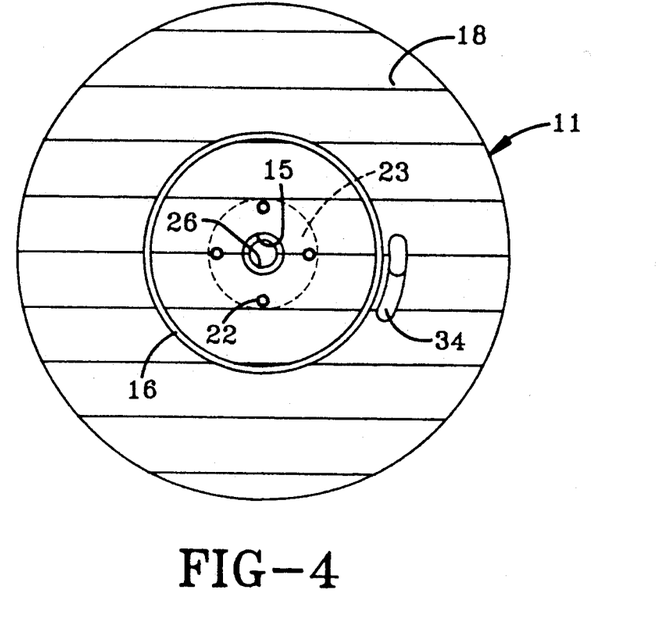
FIG. 4 is an elevational view of the inner surface of a side flange incorporated on the reel.
Figure 5:
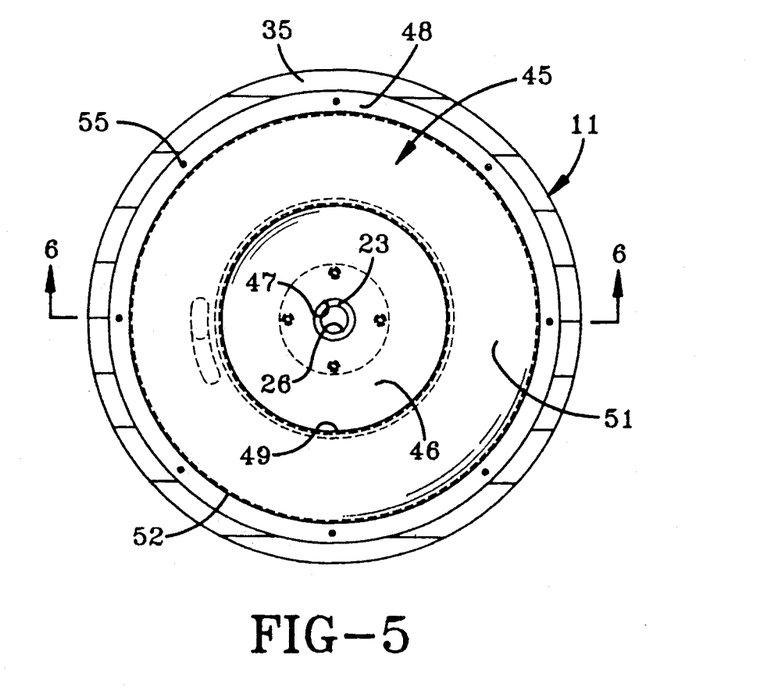
FIG. 5 is an elevational view of the outer surface of the side flange depicted in FIG. 4 with an end cover installed.
Figure 8:
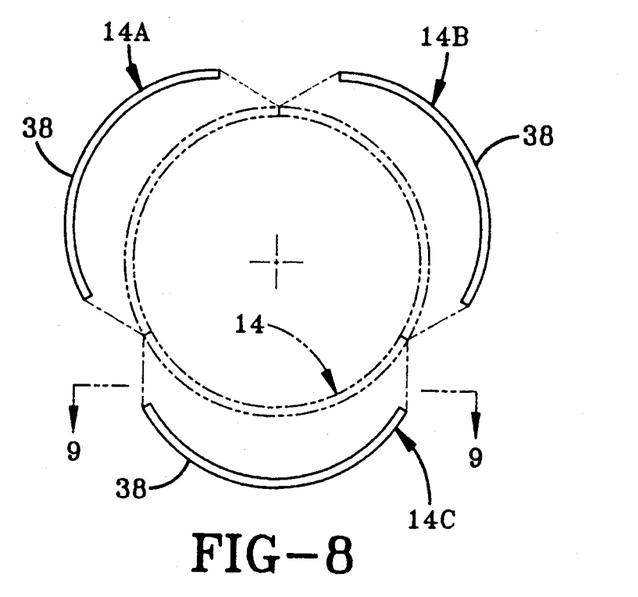
FIG. 8 is an end view of a core having three annular segments disposed to form an annular cylinder.
Figure 9:
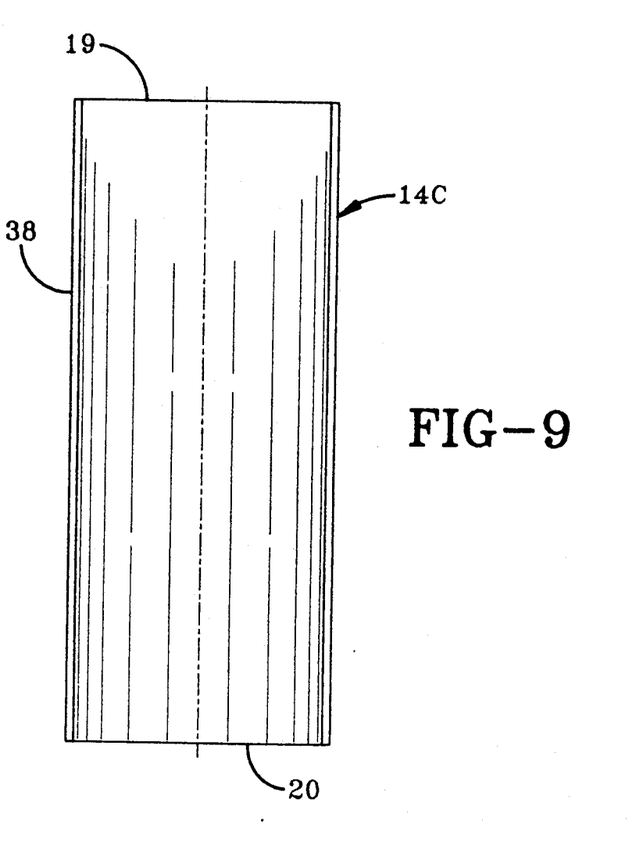
FIG. 9 is an elevational view of one core segment taken substantially along line 9—9 of FIG. 8.
Figure 10:
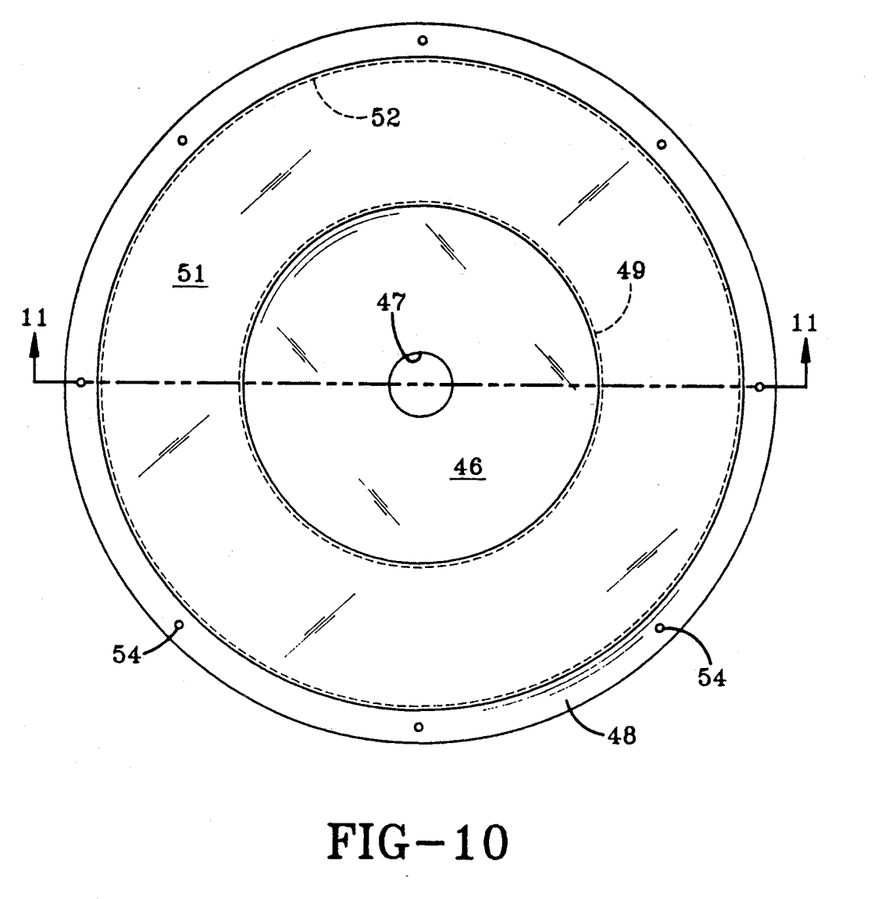
FIG. 10 is an elevational view of the end cover.
Figure 11:
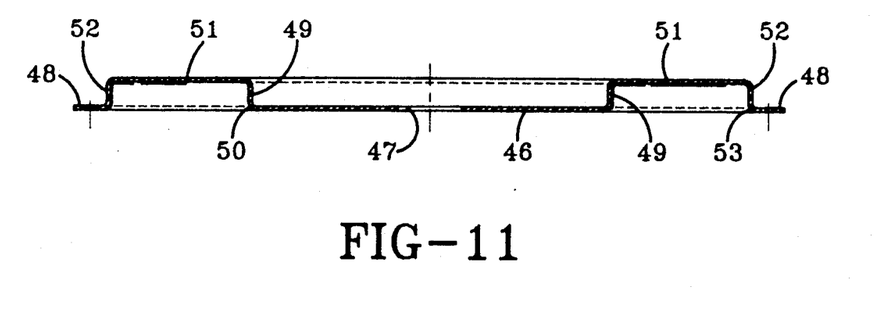
FIG. 11 is a transverse section taken substantially along line 11—11 of FIG. 10; and, FIG. 12 is a diagrammatic view of the present cable reel mounted on a trailer which is attached to a vehicle.

The core 14 may be formed in a single cylindrical component or in a plurality of core segments such as segments 14A, 14B and 14C identified in FIGS. 2 and 8. It has been found most efficient to divide the core into three segments when the core 14 is being prepared at one location and shipped to another location for assembly into a reel 10, or when it is anticipated that the core 14 will be shipped either separately or as a part of a disassembled reel 10.

The core 14 is, in the preferred embodiment, a composite material made from an isothalic (high grade polyester) resin and a sand filler. The polyester resin and sand filler may be rotatably, or centrifugally, cast within a steel pipe mold. The use of a sand filler, approximately sixty (60%) percent by volume, lowers the cost of the finished product and provides the desired roughness to the radially outer surface 38 of the core 14. When the desired base core thickness has been achieved, a layer of glass is applied to the inner periphery of the cast shell followed by a layer of polyester resin which covers the glass and holds it in situ. The resulting coefficient of friction of the outer surface of the core is approximately 0.5 which compares favorably with steel (0.45) and greatly exceeds wood-stave (0.21), or fiber (0.08), cores. The composite core has a coefficient of thermal expansion of 0.0000089 inches per degree (Fahrenheit) as compared to steel (0.000011 inches per degree) and wood-stave, or fiber, (0.000034 inches per degree). This presents one method of preparing the composite core 14. Those familiar with plastic material will appreciate that other materials and different manufacturing methods may be employed.

The glass layer provides the desired rigidity to the composite core 14. If the core 14 is to be divided into core segments 14A, 14B and 14C, the cylindrical core may be sawn, or otherwise sliced, axially into the number of core segments desired. The small amount of material removed does not adversely affect the desired, substantially annular configuration of the assembled core 14. In addition to the favorable coefficient of friction, a core 14 made by the foregoing process provides an outer surface 38 does not deteriorate with use, thermal warpage is insignificant and climatic changes do not adversely affect the dimensional stability thereof. With these physical characteristics, the reel 10 is very stable during storage, even outdoors, and creep is not evident during dispensing of the cable 29.

The core 14, or core components 14A, 14B and 14C, can be stored separately from the flanges 11 and 12 prior to assembly. Generally, the reel is wound with cable at considerable distance from the unwinding or dispensing location. For efficient use of material, it is desirable to return the reel or the components thereof to the winding facility when emptied. With the present invention the reel 10 can be readily disassembled, after the cable has been dispensed, for return to the cable winding facility. The smaller volume of the disassembled storage reel reduces the shipping cost and allows the reels 10 to be maintained by the dispensing party in a minimum of space after the cable 29 is dispensed and permits efficient packaging during return to the cable winding facility.

Figure 12:
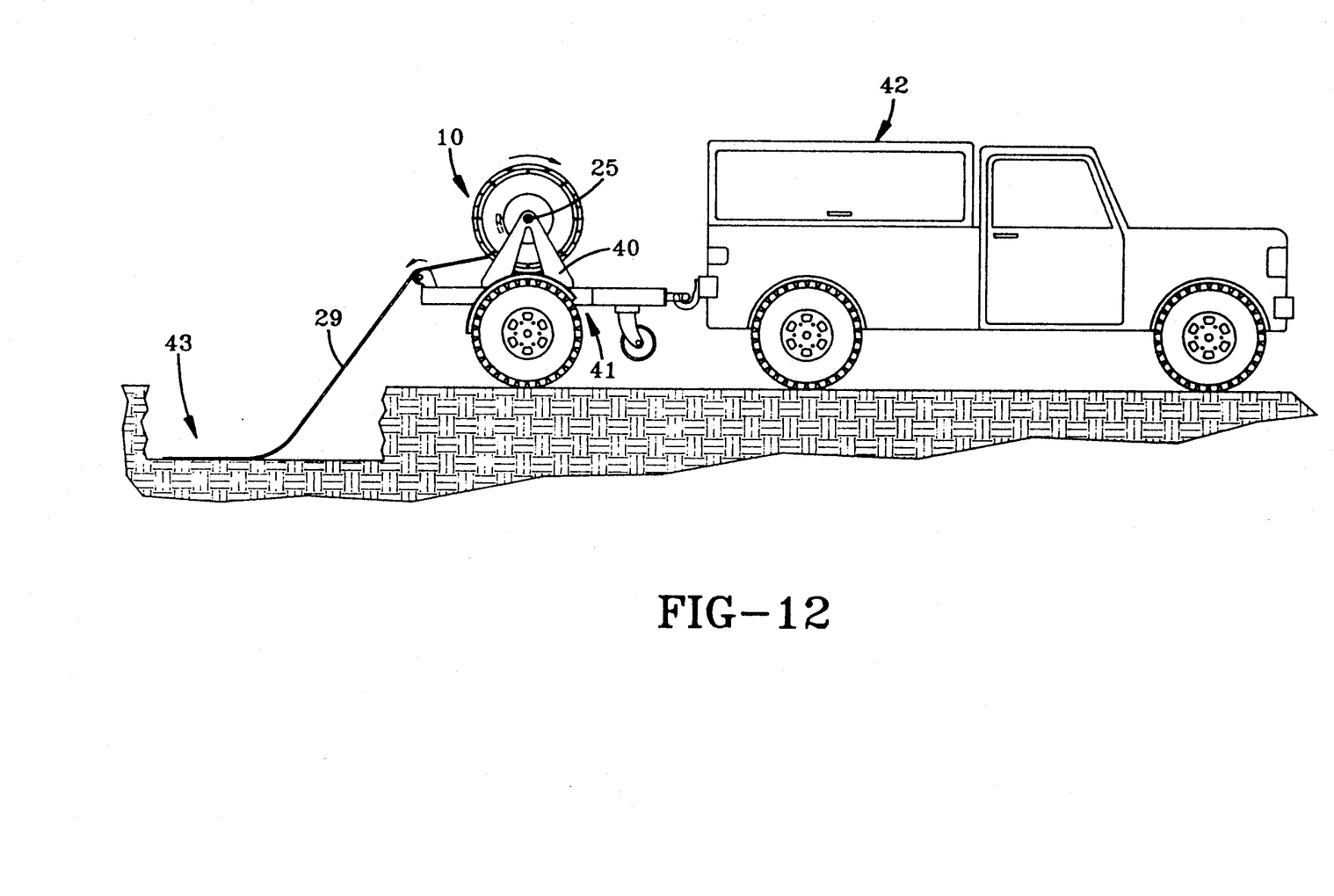

The reel 10 and cable 29 are generally mounted on stanchions 40 which are components of a trailer 41, as represented in FIG. 12. The reel 10 is rotatably supported on the axle 25. The trailer 41 may be towed by a vehicle 42 while the cable 29 is dispensed from the rotating reel into a trench 43. The cable 29 can also be dispensed from a parked trailer 41 into overhead supports in a well known manner. By whatever approach the cable 29 is dispensed, it is during that operation when the adverse effects of cable creep are most pronounced. With the prior art fiber, or wood-stave, core reels, the cable end 33 (FIG. 1) becomes loose and flails about as it extrudes outwardly through the anchor aperture 34. This flailing can cause damage to the vehicle 42 and the trailer 41 as well as the reel 10 and any inattentive personnel within the range of the flailing end 33. Thus, with prior art reels a worker is required to keep track of the extruded cable and trim the end 33 from time to time. In addition to the damage to the surrounding components, the cable length that is extruded is normally unusable, particularly in the relatively short lengths trimmed from the end 33. This results in a cost penalty of one to one and one-half percent (1 to 1.5%) of the cable cost. While the mechanics of "creep" are not fully understood, it is believed that a lack of core rigidity and insufficient frictional engagement between the core and the cable contribute to this phenomenon.

The flanges 11 and 12 are generally constructed of wood and in some instances will have to be discarded after the cable has been dispensed, certainly prior to the useful life of a core 14 embodying the concepts of the present invention. In that situation, the core 14 will be returned to the winding facility, and the flanges 11 and/or 12 will likely be discarded by the cable dispensing personnel. The reusable core components are beneficial to the cable dispensing party even when the flanges are not reusable. The anchor plates 23 and the axle 25, if integral, may be returned to the cable winding facility, but if those are separate components, the axle 25 can be retained by the cable dispensing party. It may, therefore, be financially more attractive to employ a separate axle 25.

Figure 6:
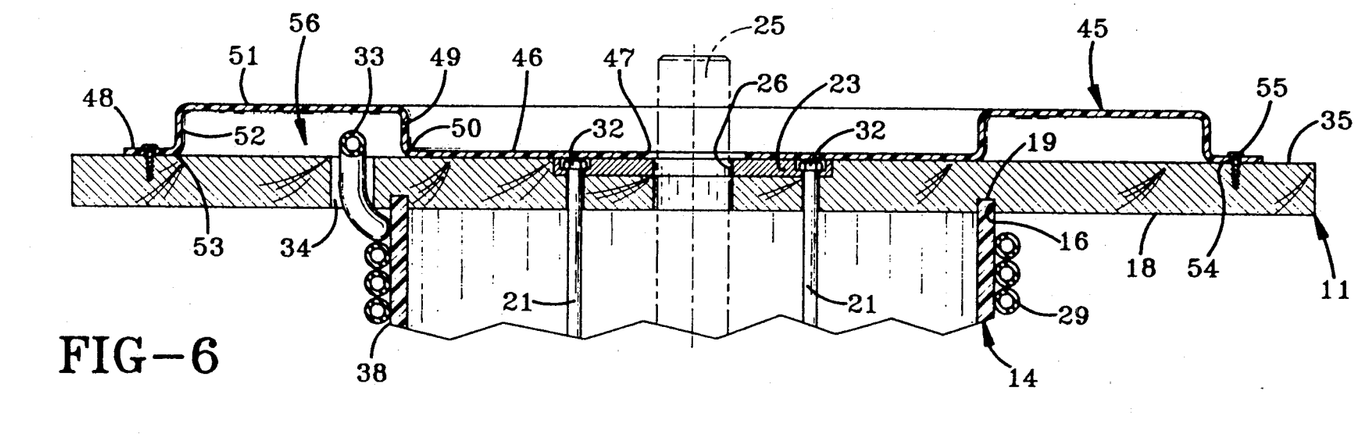
FIG. 6 is an enlarged transverse section taken substantially along line 6—6 in FIG. 5.
Figure 7:
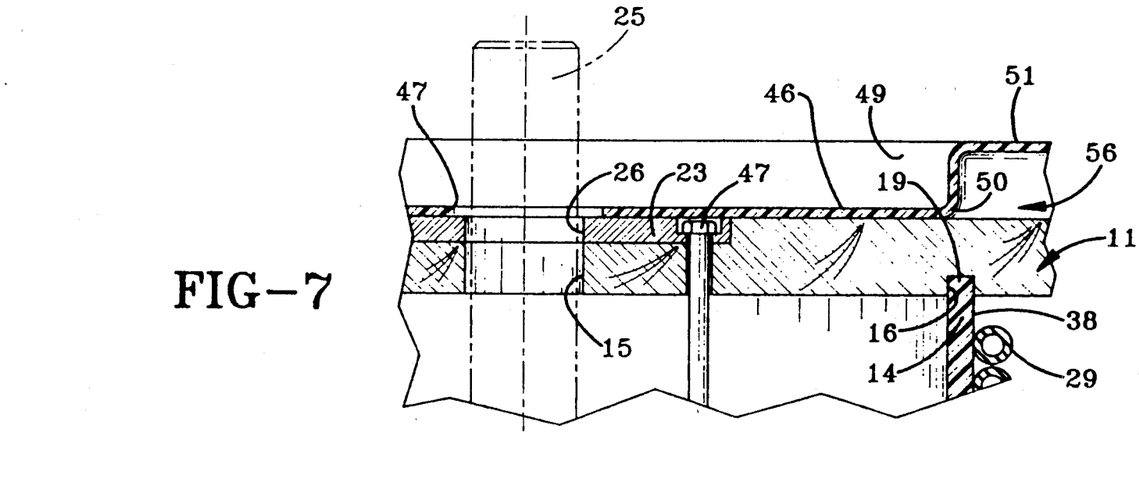
FIG. 7 is a further enlarged portion of FIG. 6.

An end cover 45 may be secured to the exterior surface 35 of at least one flange 11 or 12. In some situations it may of course, be desired to utilize an end cover 45 on both end flanges 11 and 12. The end cover 45, as seen in FIGS. 6 and 7, may have a substantially flat, circular central hub plate 46 with a central aperture 47 that is located in register with the central bearing opening 26 in the anchor plate 23 as well as the central opening 15 of the side flange 11 and/or 12 on which the end cover 45 is mounted. A radially outermost mounting flange 48 is coplanar with the central hub plate 46. A radially inner, annular wall 49 extends axially outwardly from the radially outer edge 50 of the central hub plate 46 to join with an axially outermost end wall 51 that is axially displaced from, and substantially parallel to, the central hub plate 46. A radially outer annular wall 52 extends axially outwardly from the radially inner edge 53 of the mounting flange 48 to join with the axially outermost end wall 51. A plurality of circumferentially spaced apertures 54 are provided in the mounting flange 48. The apertures 54 permit the use of threaded fasteners, such as screws, 55 to secure the end cover 45 to the exterior surface 35 of either flange 11 or 12.

The end wall 51, and the radial walls 52 and 53 conjoined thereto, cooperate to form a cavity 56 within which the cable end 33 is contained. The containment cavity 56 will also serve to limit the length of cable that can extrude through the anchor aperture 34 and is particularly useful with prior art reels. The end cover 45 will, however, also provide added protection for the improved reel 10 of the present invention. The end cover 45, when used with the fiber core or wood stave reels, will limit the amount of wasted cable and provide a safer and more secure environment during dispensing of the cable 29. It should be appreciated that the containment cavity 56 will have a volume considerably less than would be occupied by the one percent or greater length of cable 29 that is wasted by creep when using prior art reels.

The end cover 45 is preferably formed of a fiber filled plastic material to provide strength and stability. The end cover 45 can be removed from the flange 11 or 12 on which it is mounted for return shipment to the cable winding facility or can remain attached to the flange if it is also to be returned. The end cover 45 is reusable and will generally have a longer economic life than the flanges and therefore will contribute significantly to the cost reduction of individual reels 10. The preferred construction of the end cover 45 also allows it to be as recyclable as the core 14. When an end cover 45 is employed on the end flange 11 or 12, the end of the cable 29 will not flail about in the event that the securing staple 36 should loosen.

The foregoing description of an exemplary embodiment of a reel and end cap embodying the concepts of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a reel embodying the concepts of the present invention precludes creep and the disadvantages associated therewith but also that the other objects of the invention can likewise be accomplished.

I claim:

1. A storage reel comprising:
a pair of side flanges;
said side flanges having lateral exterior surfaces and lateral opposing surfaces;
said lateral opposing surfaces defining the axial extent of the storage reel;
a core positioning means associated with each said side flange;
core means;
said core means having opposite ends adapted cooperatively to engage said core positioning means;
means to secure said pair of side flanges in axially spaced relation with the opposite ends of said core means engaging said core positioning means;
said core means defining a storage base that extends between said side flanges to receive a cable of predetermined length;
said storage base having a substantially cylindrical surface with a roughness value sufficient to limit creep between said cylindrical surface and the cable to a value less than one tenth of one percent (0.1%) of the length of the cable to be stored on the reel.

2. A storage reel, as set forth in claim 1, further comprising:
a cable anchor passage penetrating at least one side flange at a point in proximity to, and radially outwardly of, said core positioning means; and,
means to secure said cable end penetrating said anchor passage to the exterior surface of that side flange penetrated by said anchor passage.

3. A storage reel, as set forth in claim 2, further comprising:
an end cover secured to the axially outer surface of at least that side flange penetrated by said anchor passage;
said end cover cooperating with said exterior surface to define an enclosed containment cavity.

4. A storage reel, as set forth in claim 1, wherein:
said core positioning means is defined by an annular groove in the lateral opposing surface of each side flange;
said storage base has a coefficient of friction at least 0.499.

5. A storage reel and cable comprising:
a pair of side flanges defining the axial and radial outer extents of an annular cable storage volume;
core means extending between the side flanges to define an inner, substantially cylindrical cable engaging surface and the radially innermost extent of the annular cable storing volume;
said cable engaging surface having a coefficient of friction of at least 0.499 for cooperating with a cable stored in the storage volume to limit creep between the cable and the storage reel during storage and cable dispensing to less than one tenth of one percent of the length of the cable;
cable anchor aperture means penetrating at least one of said side flanges for permitting one end of the cable to extend therethrough;
an exterior surface on each said side flange; and,
means for securing that end of the cable extending through said anchor aperture to said exterior surface on that side flange penetrated by said anchor aperture.

6. A storage reel, as set forth in claim 5, further comprising:
an outer cover secured to said outer surface of at least that side flange penetrated by said anchor aperture and cooperating therewith to define a containment cavity communicating with said anchor aperture.

7. A storage reel and dispensing apparatus having:
a storage reel having a pair of side flanges, a cylindrical core secured between the side flanges and cooperating therewith to define a cable storage volume;
means for rotatably mounting said storage reel to permit said cable to be dispensed;
a cable stored on said reel and having a first end secured to said reel at a location on a surface of one side flange outside of the cable storage volume;
side cover means secured to the surface of the one side flange defining an enclosed cavity encasing the secured end of the cable;
said side cover comprising:
a central hub portion;

a radially outer mounting flange substantially coplanar with said central hub portion;

an end wall located axially of, and parallel with respect to, said central hub portion and said outer mounting flange;

a radially inner annular wall extending axially between said central hub portion and said end wall;

a radially outer annular wall extending axially between said mounting flange and said end wall; and, said containment cavity bounded by said side flange, said end wall and said radially outer and radially inner annular walls.

8. A storage reel and dispensing apparatus, as set forth in claim 7, wherein;
said cylindrical core has a cable engaging surface with a coefficient of friction which cooperates with the cable to limit creep between the cable and the storage reel to length less than one tenth of one percent of the length of said cable stored on the reel.

9. A storage reel and dispensing apparatus, as set forth in claim 7, wherein:
the coefficient of friction of the cable engaging surface is greater than 0.499.

10. A storage reel and dispensing apparatus, as set forth in claim 7, wherein:
the cylindrical core is defined by at least two annular segment members which cooperate to define a substantially cylindrical body having opposite ends;

each side flange having an annular groove formed therein;

said opposite ends of the core being received in said annular grooves on the side flanges; and, means for securing the side flanges together with said cylindrical core segment members disposed therebetween.

* * * * *